United States Patent
Jaecklin et al.

[15] 3,707,321
[45] Dec. 26, 1972

[54] MAGNETO-OPTICAL PROBE HAVING NATURAL BIREFRINGENCE ERROR COMPENSATION

[72] Inventors: André Jaecklin, Ennetbaden; Manfred Lietz, Wettingen, both of Switzerland

[73] Assignee: Aktiengesellschaft Brown, Boveri & Cie, Baden, Switzerland

[22] Filed: Jan. 27, 1971

[21] Appl. No.: 110,004

[30] Foreign Application Priority Data

Feb. 4, 1970 Switzerland.................1578/70

[52] U.S. Cl.................350/151, 324/96, 350/157
[51] Int. Cl..................................G02f 1/22
[58] Field of Search.............350/151, 150, 160, 157; 324/43 L, 96; 340/174.1 M

[56] References Cited

UNITED STATES PATENTS

| | | | |
|---|---|---|---|
| 2,973,684 | 3/1961 | Nisle | 350/151 |
| 3,404,353 | 10/1968 | Harris et al. | 350/157 |
| 3,529,885 | 9/1970 | Ammann | 350/157 |
| 1,961,706 | 6/1934 | Pajes | 350/151 |
| 3,360,323 | 12/1967 | Weisman et al. | 350/150 |

OTHER PUBLICATIONS

Peters, "Gigacycle-andwidth Coherent-light Traveling-wave Amplitude Modulator" Proc..E.E.E. Vol. 53 (May 1965) pp. 455–460

*Primary Examiner*—David Schonberg
*Assistant Examiner*—Paul R. Miller
*Attorney*—Pierce, Scheffler & Parker

[57] ABSTRACT

A magneto-optical probe is comprised of a composite magneto-optical solid medium subjected to a variable magnetic field and constituted by a plurality of plane parallel contiguous component parts and through which an elliptically polarized light beam of adjustable eccentricity and inclination is passed for multiple reflection within the medium. After issuing from the medium, the beam which is now again substantially linearly polarized and inclined by an amount proportional to the magnetic field is passed through an optical divider and the two parts of the beam are passed respectively through analyzers which produce two phase-shifted linearly polarized light signals that are then passed to photo-detectors which convert the light signals into corresponding electric signals for further electronic processing.

6 Claims, 4 Drawing Figures

MAGNETO-OPTICAL PROBE HAVING NATURAL BIREFRINGENCE ERROR COMPENSATION

The present invention relates to an improved probe of the magneto-optical type wherein an optically-active medium is subjected to the influence of an alternating magnetic field to be measured, and a light beam is passed through the medium, the measurement of the magnetic field being a function of a variation in the state of oscillation of the beam as it travels through the medium.

It is known, (e.g. IEEE J. of Quantum El. QE-2, 1966, page 255) to measure magnetic fields, and particularly those produced by electrical currents at maximum voltage levels, by arranging a magneto-optical solid (Faraday rotator), preferably of flint glass, which develops optical activity under the influence of this magnetic field, and then determining the rotation of the plane of oscillation of a linearly polarized light beam which is passed through it, preferably by an electronic evaluating circuit.

However, such measurements are not entirely accurate, since magneto-optical solids have a practically unavoidable residual bi-refringence. Stress bi-refringence of the order of $(n_o - n_{ao})/n_o \approx 10^{-6}$ ($n_o$ = index of refraction for the direction of the ordinary beam, $n_{ao}$ = index of refraction for the direction of the extraordinary beam) also appears in the best magneto-optical materials. The error caused in the type of measurement described above is particularly great when the beam is conducted on a long path through the magneto-optical solid, which is necessary if good resolution is desired.

Compensation for natural bi-refringence in electro-optical crystals by simple series-connection of additional bi-refringent media with corresponding orientation is known (e.g. Proc. IEEE 53, 1965, pages 455–460). This method of compensation, however, is not readily applicable to magneto-optical mediums because the tensor of the dielectric constants $\epsilon$ of a magneto-optical solid, which is related with the index of refraction n by the equation $n = \sqrt{\epsilon}$ is so changed when the magnetic field is applied that the simple compensation conditions of electro-optical solids are no longer valid. Bi-refringence errors of magneto-optical solids can therefore only be approximately eliminated with an applied magnetic field.

The primary object of the present invention is to provide an improved form of magneto-optical probe of the above described type wherein the measuring error, caused by natural bi-refringence characteristics of the magneto-optical medium is reduced to a minimum in order that the measuring accuracy of the probe will be considerably improved.

The problem is solved, in accordance with the invention, by providing means with which the light beam can be elliptically polarized before it enters the magneto-optical medium, and the eccentricity and inclination of the ellipse can be adjusted and/or the magneto-optical medium consists of at least two contiguous component parts whose orientation relative to one another, indices of refraction and/or thickness determinent for the optical path lengths are so selected that the sum over the product of the respective optical path lengths through the different components, and of the difference of two indices of refraction measured in the direction of propagation of the light for two directions of oscillation extending perpendicularly to each other is less than $0.1/2\pi$ multiplied by the wavelength of the light, preferably zero.

An elliptic polarization of the beam entering the body of magneto-optical material can be effected, as known, by first polarizing the light beam linearly, and then conducting it through a bi-refringent plate, cut parallel to the optical axis, and arranged perpendicular to the light rays, so that a phase difference between the components of the beam with a direction of oscillation in the two main axes and a superposition to elliptically polarized light appears.

The eccentricity, of the oscillation ellipse can be best influenced by using a plate which produces a phase difference $\pi/2$ and a path length difference, respectively, of $\lambda/4$ between the two components of oscillation, so-called quarter-wave plates, and rotating this plate in a plane perpendicular to the light beam. One then obtains an elliptical oscillation, principal axes of which are parallel to principal axes of the quarter-wave plates. The eccentricity of this ellipse varies in such a way that, in the extreme cases where the oscillation direction of the light coincides with a principal axis of the plate, linearly polarized light is formed once again, and in the intermediate case where the oscillation direction of the light is inclined by 45° to the principal axis of the plate, circularly polarized light is obtained.

In a rotation of the axes of the plates by an angle $\alpha$ to the direction of oscillation of the incident light, the ratio of principal axes $a$, $b$ of the ellipses to each other is: $a/b = \tan \alpha$.

Another possibility of varying the eccentricity of the oscillation ellipse would be to vary the thickness of the plate and thus vary the phase difference between the light components.

The inclination of the oscillation ellipse is preferably adjusted by arranging in the path of the rays of the light beam, before or behind, the above-described quarter-wave plate, a half-wave plate which thus produces a path difference $\lambda/2$ and a phase difference $\pi$, respectively between the light components along the directions of the main axes, and by also making this latter plate rotatable in a plane perpendicular to the light beam. Half-wave plates turn linearly polarized light by an angle $\delta$ which is equal to double the angle $\beta$ by which the main axes of the ellipse are inclined to the oscillation direction of the light at its entrance, hence $\delta = 2\beta$. With elliptically polarized incident light, principal axes $a$, $b$ of the ellipse are inclined to the same extent.

Another possibility of adjusting the inclination of the oscillation ellipse would be to bring an optically active material into the path of the light rays and to vary the inclination of the oscillation direction of the passing light by varying the optical path length, the applied magnetic field and the solution concentration etc.

As an alternative to the above described measures according to the invention, or which provides a particularly suitable solution according to the idea of the invention, in the combination with these, the magneto-optical medium is especially designed. It is composed of at least two component parts which are joined in face-to-face contact by any suitable means such as, for example, a cement having an index of refraction which is of the same order as that of the material from which the component parts of the medium are formed. The component parts of the medium have two principal optical axes on the basis of the inherent bi-refrigence characteristic of the medium. If light falls on the component parts, the index of refraction $n_1$ applies to the component oscillating along one principal axis, and similarly the index of refraction $n_2$ applies to the component oscillating along the other principal axis, and which is perpendicular to the first. Accordingly, $n_1$ and $n_2$ are the indices of refraction for the ordinary or the extraordinary beam. By corresponding selection of the orientations of the principal axes of the component parts to each other, with different media or the index of refraction, and/or the path lengths $l_i$ with which the beam is associated through the component parts, it can be achieved that:

$$\sum_i (n_x^{(i)} - n_y^{(i)}) \cdot l_i$$

is small, possible zero. $x$ and $y$ are the coordinates extending perpendicularly to each other in a plane perpendicular to the direction of propagation $z$ of the light. It is advisable, but not absolutely necessary, to select the $x$ and $y$ directions parallel to the bi-refringent principal axes.

In practice, the above-mentioned condition is satisfied in a particularly easy manner by cutting the component parts of the magneto-optical medium from a homogeneous solid having in particular the same history, such as flint glass, for example, turning the bi-refringent main axes of the component parts alternately by $\pi/2$ to each other, and so selecting the thickness of each component part such that the thicknesses of the component parts having one orientation is equal to the sum of the thickness of the component parts having the other orientation.

If the $x$-component of the incident light is parallel to that of a bi-refringent main axis, then, for example, $n_x^{(1)} = n_1$ and $n_y^{(1)} = n_2$ in a first component part. In a second component part then, $n_x^{(2)} = n_2$ and $n_y^{(2)} = n_1$. Altogether one thus obtains with the two-part medium, for the $x$-component of the light the optical path $n_1 l_1 + n_2 l_2$, and for the $y$-component the light path $n_2 l_1 + n_1 l_2$.

Thus one obtains the following relation $$\sum_{i=1}^{2} (n_x^{(i)} - n_y^{(i)}) l_i = (n_1 l_1 - n_2 l_1 + n_2 l_2 - n_1 l_2)$$

This term is zero for $l_1 = l_2$

The bi-refringence error with a simultaneous Faraday effect is the more difficult to compensate the greater is the total bi-refringence appearing in a connected part, which results from the difference of the optical path $(n_x^{(i)} - n_y^{(i)}) l_i$.

According to another expedient embodiment of the invention, the component parts of the magneto-optical medium are therefore made thin. In order to obtain, nevertheless, a long optical path which is necessary for a sufficiently great Faraday rotation, without having to connect too many component parts of the medium in series, the outer surfaces of the outermost component parts are made reflective e.g. by a coating of silver, and the beam is so conducted through the medium that it is reflected many times and still covers a sufficiently long optical path for a good Faraday resolution, without having to cover too long an optical path in any individual component part.

It can be shown that maximum resolution can be obtained with an electronic plotting instrument in accordance with Swiss patent No. 433,065 or DOS 1,918,730 if the phase error produced by the residual bi-refringence is $\phi < 0.1$ and the path difference:

$$2\pi \sum_i (n_x^{(i)} - n_y^{(i)}) l_i < 0.1 \lambda_0$$

($\lambda_0$ being the wavelength of the light in a vacuum). This can be easily achieved with the improved probe in accordance with the invention.

Other advantages and features inherent in the improved magneto-optical probe arrangement will become more apparent from the following detailed description of one suitable embodiment thereof and the accompanying drawings wherein.

Figure 1:
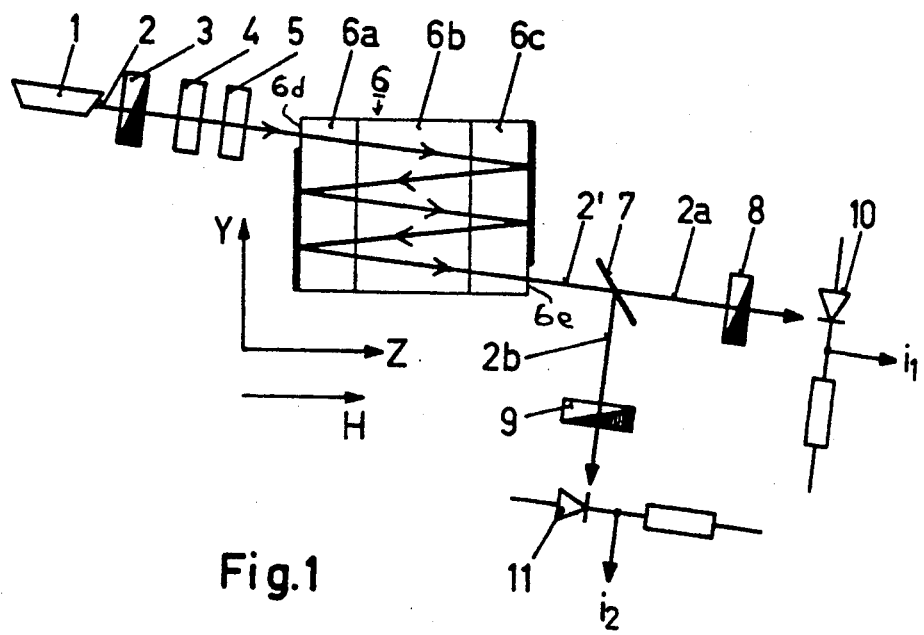
FIG. 1 is an overall view of the improved magneto-optical probe structure together with the remaining components associated therewith in the system for measuring the strength of an alternating magnetic field.

With reference now to FIG. 1, a light beam 2 is depicted as issuing from a source of monochromatic light, for example, a laser 1. Beam 2 is passed first through a polarizer 3, thence through a half-wave plate 4 and a quarter-wave plate 5 to a composite magneto-optical solid 6 which is made, for example, from heavy flint glass. Since a laser 1 inherently furnishes linearly polarized light, polarizer 3 is not absolutely necessary. However, by using this polarizer and rotatably adjusting it about the axis of the light beam, one can establish, in a simple manner, a defined direction of oscillation for the beam.

The half- and quarter-wave plates 4, 5 are also arranged to be rotatably adjustable about the axis of the light beam. The eccentricity of the oscillation ellipse, shown in FIG. 2, can be adjusted by means of the quarter-wave plate 5, and the inclination of the ellipse can be adjusted by means of the half-wave plate 4.

Figure 2:
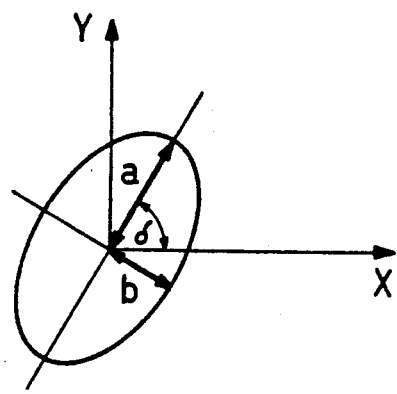
FIG. 2 is an optical detail illustrating the oscillation ellipse of the light beam before entering the magneto-optical element.

Light beam 2 after emerging from quarter-wave plate 5 enters the composite flint glass block 6 in a state of elliptical polarization, as indicated in FIG. 2. This ellipse has principal axes $a$, $b$, and is inclined in a plane X, Y by the angle $\delta$ towards the X axis. Parallel to the Z-axis extending perpendicularly to the X-Y plane extends the z-axis of the flint glass block 6. The alternating magnetic field, not illustrated, but which may be produced by current flowing in a high voltage transmission line, and which produces the optical activity in the flint glass block 6 extends preferably parallel to the z-axis of the block.

As can be seen from FIG. 1, the flint glass block 6 which forms the magneto-optical solid is a composite of three, initially separate, plane-parallel component parts 6a, 6b and 6c which are joined together in face-to-face manner by any suitable cement or liquid having an optical refraction index of the order of the refractive index of the material of the solid 6 itself. The oppositely disposed outer faces of the three-part solid 6 are provided with a reflective coating, e.g. silver over the entire surfaces thereof with the exception of entrance and exit apertures 6d, 6e for the beam adjacent the opposite ends of the block in order that the entering beam 2 will be reflected back and forth many times within the solid 6 by these silvered outer faces, as indicated in FIG. 1, prior to finally issuing from the exit 6e. This multiple reflection within the magneto-optical body improves the resolution.

The sum of the thickness of the two outer component parts 6a, 6c is equal to the thickness of the intermediate part 6b. The bi-refringent main axes of the component parts 6a, 6c are parallel to each other, while those of the intermediate part 6b are turned by 90°. Neglecting the minor inclination of the light beam to the z-axis, one thus obtains:

$$\sum_i (n_x^{(i)} - n_y^{(i)}) l_i = z(n_x^{(a)} - n_y^{(a)}) l_a$$
$$+ z(n_x^{(b)} - n_y^{(b)}) l_b$$
$$+ z(n_x^{(c)} - n_y^{(c)}) l_c$$

and because $n_x^{(a)} = n_x^{(c)} = n_y^{(b)} = n_y^{(a)} = n_x^{(b)}$ and $l_a + l_c = l_b$ $$\sum_i (n_x^{(i)} - n_y^{(i)}) l_i = 0$$

z constitutes the number of reflections of the light beam.

After issuing from the magneto-optical solid 6, the beam 2' which is now again substantially linearly polarized and inclined in its oscillating plane proportional to the applied alternating magnetic field is then passed to an optical divider, for example, a semi-transparent mirror 7 inclined 45° to the beam axis, where it is split into two beam components 2a, 2b. Beam 2a passes directly through mirror 7 to an optical analyzer 8, while beam 2b is turned through 90° by the mirror and passes to a second optical analyzer 9. These optical analyzers 8 and 9 produce at their output sides respectively two corresponding linearly polarized light signals turned relative to each other by 45°, whose respective amplitude squares, apart from a constant are, on the one hand proportional to sine 2 $\phi$, and on the other hand proportional to cos 2 $\phi$, $\phi$ being the angle of inclination of beam 2' and of the beam components 2a, 2b, respectively, proportional to the applied magnetic field, with respect to an axis of one of the analyzers 8 or 9.

These light signals, phase-shifted by $\pi/2$ with respect to the argument 2 $\phi$ are then transmitted respectively to photodetectors 10 and 11 in which they are converted into corresponding electrical current signals $i_1$ and $i_2$ for further electronic processing.

Figure 3:
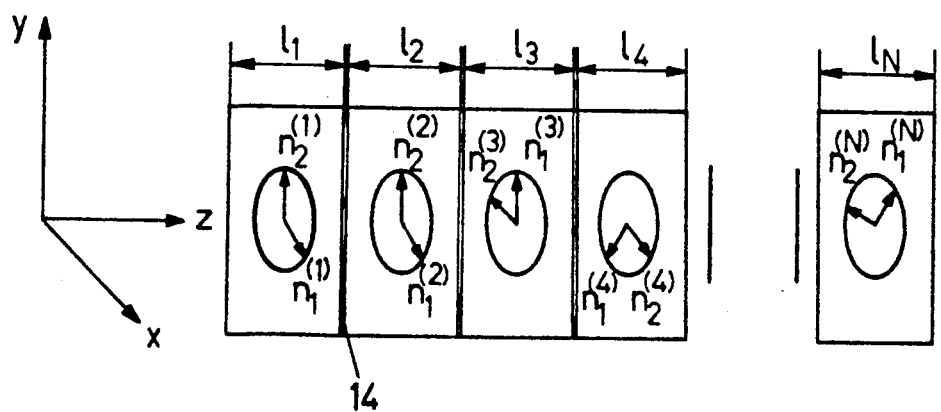
FIG. 3 illustrates a composite magneto-optical solid body in accordance with the present invention which consists of an N number of contiguous parts cemented together.

FIG. 3 illustrates the composition of the magneto-optical crystal solid of N parts of the length $l_i$ ($i = 1, 2 \ldots N$). The parts are joined in face-to-face contact by a cement, or liquid layer 14 whose optical index of refraction is preferably of the order of the refractive indices of the component parts which make up the complete solid.

The bi-refringent principal axes of component parts of the complete solid can extend here in any desired position relative to each other. However, the thicknesses $l_i$ of the component parts and the indices of refraction $n_x^{(i)} \cdot n_y^{(i)}$ for the x- and y- components respectively of the incident light are such that the above indicated condition according to the invention is satisfied.

In order to examine when the error produced by the bi-refringence is minimal, and to adjust correspondingly the orientation of plates 4, 5 and/or to arrange the construction of the magneto-optical medium 6, the electrical signals from photo-detectors 10, 11 can be transmitted respectively to the horizontal and vertical coordinate amplifiers of a conventional cathode ray oscilloscope. On the oscilloscope screen appears then, and only then, a perfect circle 12 (FIG. 4) when the bi-refringence errors are compensated. If a bi-refringence is superposed, however, on the Faraday effect, oval configurations 13 appear depending upon the magnetic field.

Since the magnetic field acting on the magneto-optical solid 6 is an alternating field, either a full circle, or several congruent full circles, or only an arcuate segment is obtained, dependent upon the amplitude of this field. For adjusting the plates 4, 5 and for the corresponding construction of the magneto-optical solid 6, the amplitude must therefore be selected so great that the image on the oscilloscope screen can be easily examined for its circular property.

Figure 4:
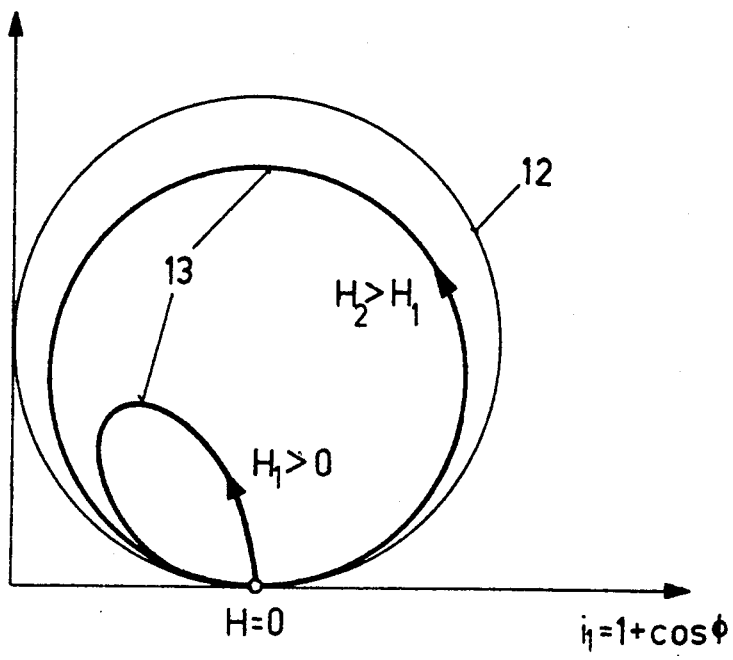
FIG. 4 are curve plots obtained when two output signals produced in accordance with the system shown in FIG. 1 are transmitted to the coordinates of an oscilloscope.

It should be pointed out that here a measuring result can be derived with great expenditure from the oval configurations (curves 13) in FIG. 4, but this expenditure can be avoided by transforming these oval curves to a true circle by means of the measures in accordance with the invention.

The combination of the concept of accordingly adjusting the eccentricity and inclination of the oscillation ellipse of the light with the concept of an appropriate construction of a composite magneto-optical solid as described is found to be particularly advantageous in connection with multiple reflections according to FIG. 1 though the beam is here not entirely parallel to the z-axis. The combination yields a maximum of resolution of the Faraday effect used for measuring a variable magnetic field.

We claim:

1. In a probe of the type including a magneto-optical medium subjected to a magnetic field of varying intensity and through which medium a beam of polarized light is conducted and whose state of oscillation varied by the optical activity of the medium in accordance with the variation in the magnetic field is measured, the improvement comprising means for elliptically polarizing said light beam and means for adjusting the eccentricity and inclination of the oscillation ellipse prior to entering said magneto-optical medium wherein a minimization of measuring error caused by natural bi-refringence of said magneto-optical medium is effected.

2. A probe of the type defined in claim 1 wherein said beam of light is initially linearly polarized, said beam of linearly polarized light is transformed to elliptical polarization by passing the beam through a half-wave plate and through a quarter-wave plate, and said means for adjusting the eccentricity and inclination of the oscillation ellipse comprises means for rotatably adjusting said plates about the axis of said beam in a plane perpendicular to the beam axis.

3. In a probe of the type including a magneto-optical medium subjected to a magnetic field of varying intensity and through which medium a beam of polarized light is conducted and whose state of oscilation varied by the optical activity of the medium in accordance with the variation in the magnetic field is measured, the improvement comprising said medium being constituted by a composite solid comprising at least two plane parallel contiguous component parts cut from a homogeneous glass block and which are adhered together in such manner that the optical bi-refringent principal axes of said component parts are turned alternately through an angle of about 90° relative to each other, and the sum of the thicknesses of component parts having one orientation being equal to the sum of the thicknesses of component parts having the other orientation wherein a minimization of measuring error caused by natural bi-refringence of the medium is effected.

4. A probe of the type as defined in claim 3 wherein said composite solid constituting said magneto-optical medium comprises three plane parallel contiguous component parts, the bi-refringent principal axes of the two outer parts being parallel to each other, the bi-refringent principal axis of the intermediate part being turned by 90° relative to the bi-refringent principal axes of said two outer parts, and the thickness of said intermediate part is equal to the sum of the thicknesses of said two outer parts, the outer surfaces of said two outer parts being provided with a reflective coating thereby to achieve multiple reflection of said light beam by all three of said parts.

5. In a probe of the type including a magneto-optical medium subjected to a magnetic field of varying intensity and through which medium a beam of polarized light is conducted and whose state of oscillation varied by the optical activity of the medium in accordance with the variation in the magnetic field is measured, the improvement comprising means for elliptically polarizing said light beam, means for adjusting the eccentricity and inclination of the oscillation ellipse prior to entering said magneto-optical medium, and said medium being constituted by a composite solid comprising at least two plane parallel contiguous component parts adhered together in such manner that the optical bi-refringent principal axes of said component parts are turned alternately through an angle of 90° relative to each other, the sum of the thicknesses of component parts having one orientation being equal to the sum of the thicknesses of component parts having the other orientation wherein a minimization of measuring error caused by natural birefringence of said magneto-optical medium is effected.

6. In a probe of the type including a magnet-optical medium subjected to a magnetic field of varying intensity and through which medium a beam of polarized light is conducted and whose state of oscillation varied by the optical activity of the medium in accordance with the variation in the magnetic field is measured, the improvement comprising said medium being constituted by a composite solid constituted by at least two plane parallel contiguous component parts adhered together, the sum of the product of the respective light paths and the respective differences between indices of refraction as measured in the direction of propagation of the light beam for two directions of oscillation extending perpendicularly to each other being less than the product of $0.1/2\pi$ and the wavelength wherein a minimization of measuring error caused by the natural bi-refringence of the medium is effected.

* * * * *